(12) United States Patent
Sullivan et al.

(10) Patent No.: US 8,655,125 B2
(45) Date of Patent: Feb. 18, 2014

(54) HIGH VOLTAGE PHOTO SWITCH PACKAGE MODULE

(75) Inventors: James S. Sullivan, Livermore, CA (US); David M. Sanders, Livermore, CA (US); Steven A. Hawkins, Livermore, CA (US); Stephen E. Sampayan, Manteca, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 455 days.

(21) Appl. No.: 13/171,372

(22) Filed: Jun. 28, 2011

(65) Prior Publication Data

US 2012/0082411 A1     Apr. 5, 2012

Related U.S. Application Data

(60) Provisional application No. 61/358,994, filed on Jun. 28, 2010.

(51) Int. Cl.
    *G02B 6/26*      (2006.01)
    *G02B 6/42*      (2006.01)
(52) U.S. Cl.
    USPC ............... 385/40; 250/208.4; 250/214 SW; 257/431; 257/433; 385/15; 385/39
(58) Field of Classification Search
    CPC ...................................................... H01I 31/08
    USPC .......................................................... 385/40
    See application file for complete search history.

(56) References Cited

U.S. PATENT DOCUMENTS

| | | | | |
|---|---|---|---|---|
| 2,055,017 A | * | 9/1936 | Praetorius et al. | 338/19 |
| 2,114,591 A | * | 4/1938 | Clark | 338/19 |
| 2,140,725 A | * | 12/1938 | Treacy | 338/19 |
| 2,560,606 A | * | 7/1951 | Shive | 257/41 |
| 3,805,124 A | * | 4/1974 | Nagasawa et al. | 338/15 |
| 4,143,941 A | * | 3/1979 | Soref | 385/18 |
| 4,182,544 A | * | 1/1980 | McMahon | 385/18 |
| H000695 H | * | 10/1989 | Weiner et al. | 257/21 |
| 5,541,751 A | | 7/1996 | Sumida et al. | |
| 6,411,746 B1 | * | 6/2002 | Chamberlain et al. | 385/2 |
| 7,420,754 B2 | * | 9/2008 | Nagasaka | 359/811 |
| 7,893,541 B2 | * | 2/2011 | Caporaso et al. | 257/778 |
| 8,258,632 B1 | * | 9/2012 | Sullivan et al. | 257/778 |

(Continued)

FOREIGN PATENT DOCUMENTS

JP           06-003692 A       1/1994
JP           2001-066628 A     3/2001

*Primary Examiner* — Uyen Chau N Le
*Assistant Examiner* — Chad Smith
(74) *Attorney, Agent, or Firm* — James S. Tak

(57) ABSTRACT

A photo-conductive switch package module having a photo-conductive substrate or wafer with opposing electrode-interface surfaces, and at least one light-input surface. First metallic layers are formed on the electrode-interface surfaces, and one or more optical waveguides having input and output ends are bonded to the substrate so that the output end of each waveguide is bonded to a corresponding one of the light-input surfaces of the photo-conductive substrate. This forms a waveguide-substrate interface for coupling light into the photo-conductive wafer. A dielectric material such as epoxy is then used to encapsulate the photo-conductive substrate and optical waveguide so that only the metallic layers and the input end of the optical waveguide are exposed. Second metallic layers are then formed on the first metallic layers so that the waveguide-substrate interface is positioned under the second metallic layers.

8 Claims, 11 Drawing Sheets

(56) References Cited

U.S. PATENT DOCUMENTS

| | | | | |
|---|---|---|---|---|
| 8,563,957 B2* | 10/2013 | Caporaso | ...................... | 250/551 |
| 2004/0081402 A1* | 4/2004 | Ouchi | ............................ | 385/40 |
| 2005/0110105 A1* | 5/2005 | Kuhara et al. | ................ | 257/432 |
| 2005/0196093 A1 | 9/2005 | Grossman et al. | | |
| 2007/0092812 A1* | 4/2007 | Caporaso et al. | ............ | 430/57.7 |
| 2009/0278409 A1* | 11/2009 | Sheu | ............................. | 307/117 |
| 2011/0101376 A1* | 5/2011 | Caporaso et al. | ............... | 257/77 |

* cited by examiner

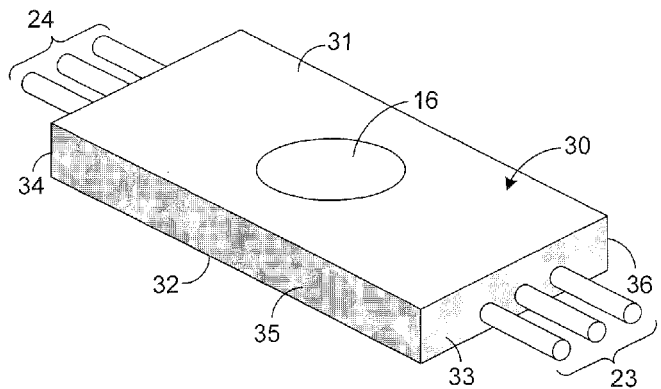
Figure 4
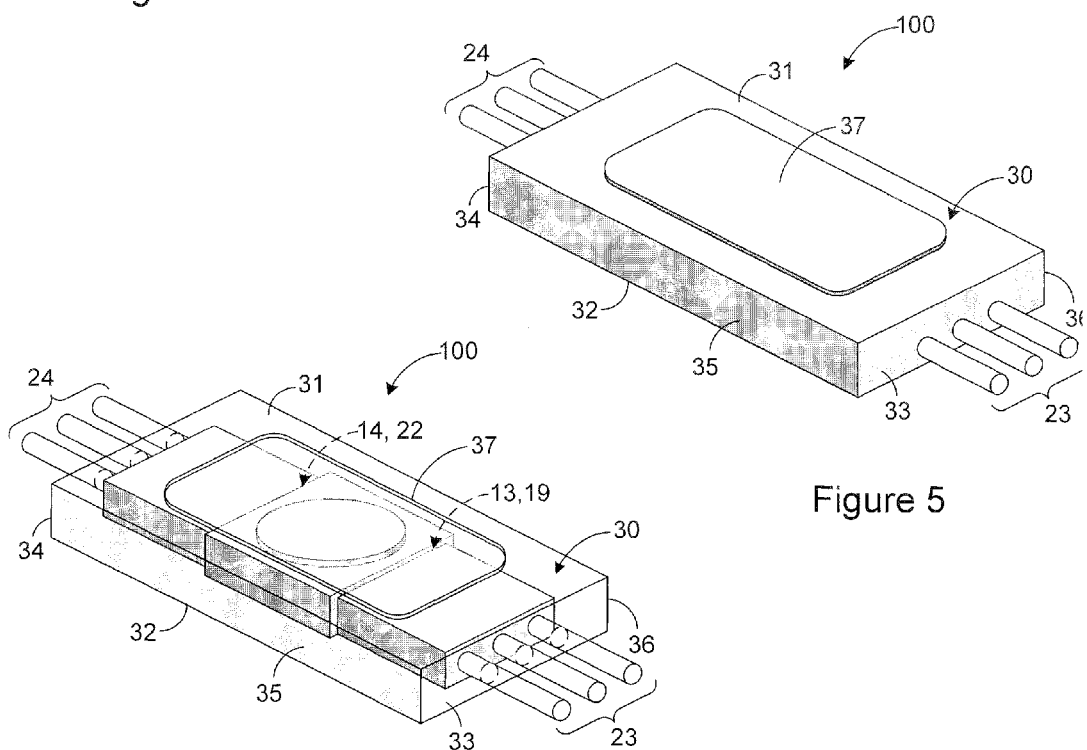
Figure 5
Figure 6

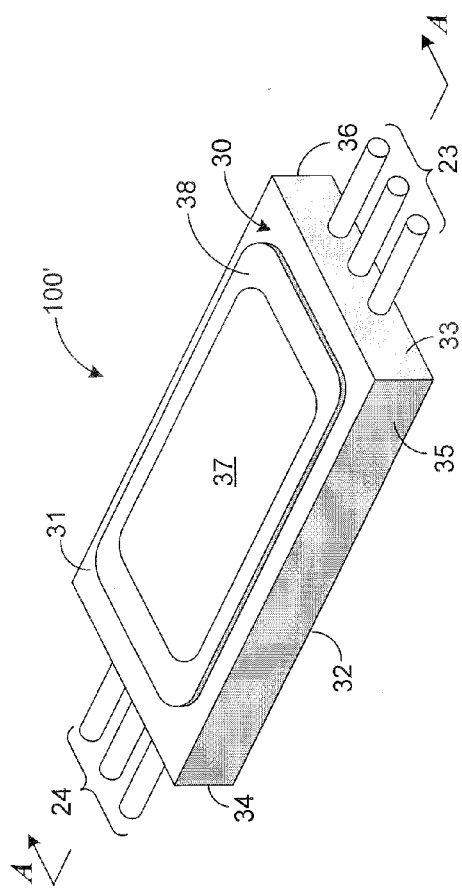
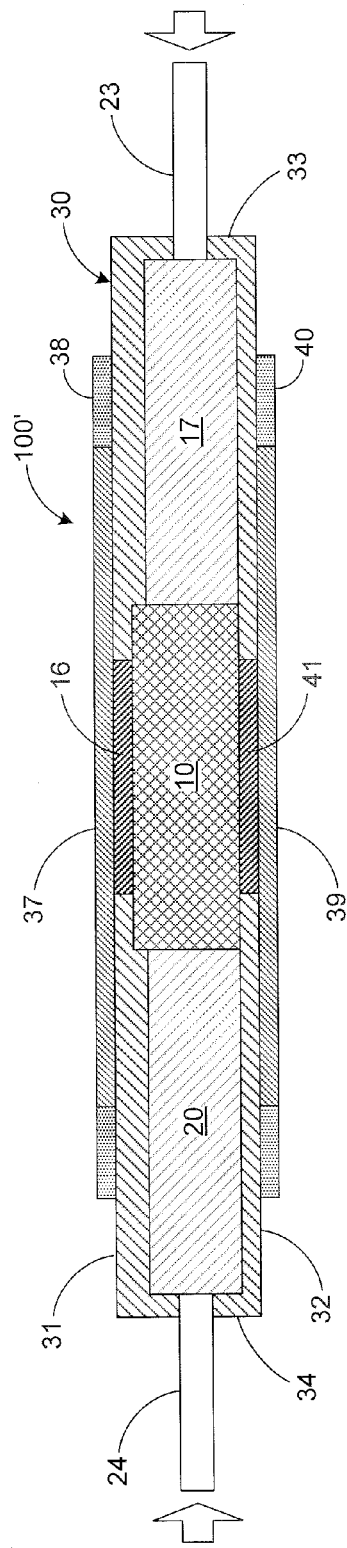
Figure 7
Figure 8

HIGH VOLTAGE PHOTO SWITCH PACKAGE MODULE

CROSS-REFERENCE TO RELATED APPLICATIONS

This application claims the benefit of U.S. Provisional Application No. 61/358,994, filed Jun. 28, 2010 and incorporated by reference herein.

FEDERALLY SPONSORED RESEARCH OR DEVELOPMENT

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to photoconductive switches, and more particularly to a high voltage photo-conductive switch package module having one or more optical waveguides bonded to a photo-conductive wafer (such as SiC or GaN) and encapsulated with a high dielectric strength material, to manage and enable operation in high electric field regions.

BACKGROUND OF THE INVENTION

Photo-switches (or photo-conductive switches) are known by which light input triggers activation of the switch to conduct current therethrough under an electric potential thereacross. However, coupling light into the switch while mitigating electric field issues remains problematic. Additionally for repetitive pulse applications, thermal management must also be considered. One example known method employs a fused silica waveguide coupled through an oil-filled gap to a silicon carbide wafer. However, this approach is limited by the dielectric field strength of insulating oil especially in very high electric field regions problems with electric field management at the interface.

For high voltage applications producing high electric field regions, there is a need for a photo-conductive switch package capable of coupling light into the photo-conductive material while mitigating electric field issues in high voltage applications, such as bulk failure of photo-switch material or surface flashover at the edges of the switch.

SUMMARY OF THE INVENTION

One aspect of the present invention includes a photoconductive switch package module comprising: a photo-conductive wafer having opposing electrode-interface surfaces, and a light-input surface; first metallic layers formed on said electrode-interface surfaces; an optical waveguide having input and output ends with the output end bonded to the light-input surface of the photo-conductive wafer to form a waveguide-wafer interface for coupling light into said photoconductive wafer; a dielectric encapsulation surrounding the photo-conductive wafer and optical waveguide so that only the metallic layers and the input end of the optical waveguide are exposed; and second metallic layers formed on said first metallic layers so that the waveguide-wafer interface is positioned under the second metallic layers.

Generally, the present invention generally pertains to a photo-conductive switch package module capable of operating in high voltage and high average power applications, e.g. as a closing switch in compact stacked pulse-forming lines, dielectric wall accelerators, and power conditioning applications for directed energy. The module includes at its core a photo-conductive wafer or substrate, which is preferably a wide band-gap material such as for example silicon carbine (SiC) or gallium nitride (GaN). The photoconductive wafer has two electrode-interfacing surfaces (typically on opposite sides), and one or more light-input surfaces.

A first metal layer is formed on each of the two electrode-interfacing surfaces of the photo-conductive substrate, and preferably the substrate is then high-temperature annealed. This annealed first metal layer provides an electrical connection to the photo-switch material. Preferably, the area of the first metal layer is smaller than the electrode-interface surfacing surface of the substrate so that an edge margin exists around this annealed first metal layer.

One or more optical waveguides are then bonded to the light-input surfaces to couple light from a light source into the photo-conductive material. The waveguide material may be, for example, fused silica, $Al_2O_3$, un-doped SiC, or other optically transparent and preferably thermally conductive material, so that it may simultaneously couple light into the material while mitigating surface flashover issues at the edges of the switch and simultaneously conducting heat away from the switch. And bonding methods may include, for example, bonding with optically transparent compounds (i.e. silicone or resin-based compounds), chemically bonding, such as by hydroxyl or silicate bonding, adhesive-free bonding (i.e. Van der Waals bonds), or fusion bonding, such as via Frit or molten glass. Processes for fusion bonding may include electrical discharge and/or laser brazing/welding. Optical fibers may then be bonded to the opposite ends of the waveguide (i.e. the light-input ends of the waveguide) using similar bonding methods. It is notable that optical fibers (fiber optics) are also considered a type of waveguide as they are also transport light. Therefore optical fibers may alternatively be coupled/bonded directly to the photo-conductive substrate with the same of similar bonding methods as those used for other optical waveguides. Also, the wide band-gap photo-switch material may be precision machined (i.e. "lapped" or other process) into optically transparent material such as fued silica, Al2O3, or un-doped SiC.

The assembly comprising the metalized substrate and waveguides are then encapsulated with a high dielectric strength material, such as epoxy or other dielectric material to mange electric fields. The encapsulation covers all parts of the package with only the metal layers and the light-input ends of the waveguides exposed.

A conductive layer (i.e. second metal layer) is then formed over the exposed first metal layers such that the edges of the conductive layer extend over the bonded interface between the waveguide and the substrate, and the waveguide-substrate interface is posited under the conductive layer. The electric field may be graded at enhancement points along the edges of the conductive layer by forming an electrically resistive layer on the surface of the encapsulation to surround the conductive layer.

Furthermore, optical losses may be minimized by optionally bonding the waveguide to the photo-switch substrate at an optimum angle (e.g. Brewster's angle). In addition, cladding or other optical coating may be applied to the waveguide to reduce losses at the interface to materials of different dielectric coefficient including the surrounding epoxy.

BRIEF DESCRIPTION OF THE DRAWINGS

The accompanying drawings, which are incorporated into and form a part of the disclosure, are as follows.

FIGS. 1-8 show various views and at various fabrication stages of a first exemplary embodiment of the photo-conductive switch of the present invention having two waveguides and corresponding waveguide-substrate interfaces.

DETAILED DESCRIPTION

Figure 1:
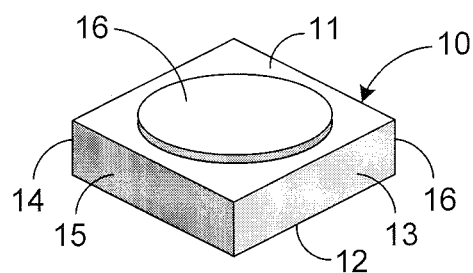

Turning now to the drawings, FIGS. 1-8 show various views and at various fabrication stages of a first exemplary embodiment of the photo-conductive switch of the present invention (100 in FIGS. 7 and 8) having two waveguides and corresponding waveguide-substrate interfaces. Starting with FIG. 1, a photo-conductive substrate 10 is shown having a top surface 11, a bottom surface 12 and side surfaces 13-16. The top and bottom surfaces 11, 12 are the electrode-interfacing surfaces, as can be seen by the first metal layer 16 formed on the top surface 11, and side surfaces 13 and 14 are the light-input surfaces. As shown in FIG. 8, another first metal layer 41 is formed on the bottom surface 12. It is notable that while the metal layers 16 and 41 are shown as having a circular configuration, other geometries may be used as well. These metal layers are preferably annealed at this stage.

Figure 2:
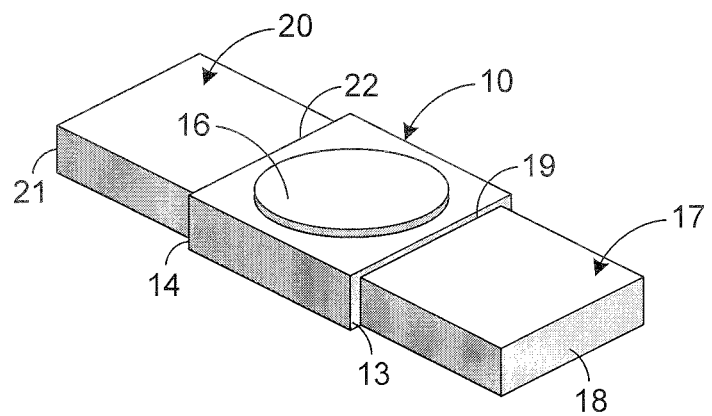

FIG. 2 shows two waveguides 17 and 20 bonded to the substrate 10. In particular, surface 19 of the waveguide 17 is bonded to the light-input surface 13 of the substrate, and surface 22 of the waveguide 20 is bonded to the light-input surface 14 of the substrate. As previously discussed, various bonding methods may be employed to produce preferably a structurally rigid bond.

Figure 3:
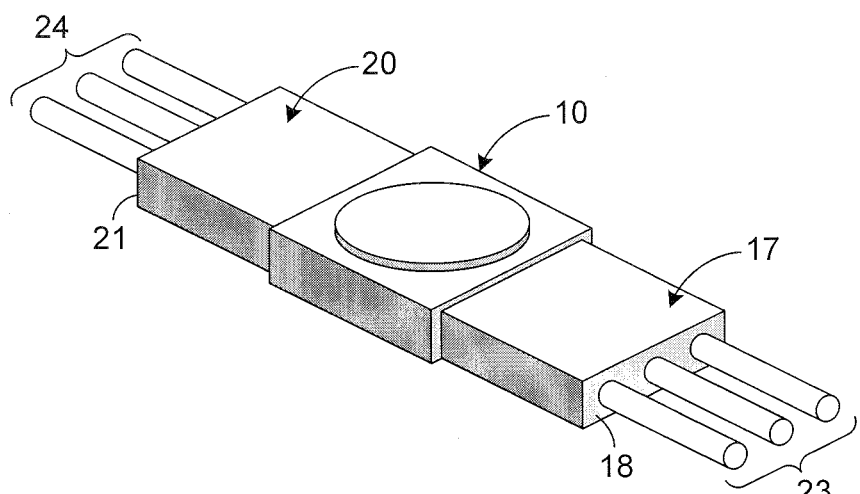

FIG. 3 shows two sets of optical fibers 23 and 24 bonded to the light-input surfaces 17 and 21 of the waveguides 17 and 20, respectively. While three are shown, it is appreciated that any number of fiber optics may be employed to deliver the proper level of light to the substrate. Furthermore, in one example embodiment, the optical fibers coming in on one side of the substrate may be offset or staggered with respect to optical fibers coming in on the opposite side of the substrate for better light dispersion in the substrate.

FIG. 4 shows an encapsulation structure 30 formed around the assembly of FIG. 3. The structure 30 has a top surface 31, a bottom surface 32, and side surfaces 33-36. As shown the optical fibers 23, 24 extend out from side surfaces 33 and 34. And the first metal layers 16 and 41 remain exposed.

FIG. 5 next shows a conductive layer, i.e. a second metal layer, 37 formed over the exposed first metal layers 16 and 41 and a portion of the top surface 31 of the encapsulation structure. And as shown in the partially transparent view of FIG. 6, the conductive layer 37 extends beyond the waveguide-substrate interface indicated at 14,22 and 13, 19. Another second metal layer is formed as shown on the bottom surface 32 of the encapsulation structure, as shown in FIG. 8. FIGS. 5 and 6 show the completed first embodiment, indicated at reference character 100.

FIG. 7 shows an optional resistive layer 38 formed on the top surface 31 of the encapsulation structure and surrounding the second metal layer 37 to form a second embodiment 100' of the photo-conductive switch package module. Though not shown in FIG. 7, the same is true for the second metal layer 39 shown in FIG. 8. And FIG. 8 shows the cross-section view of the second embodiment 100'.

Figure 9:
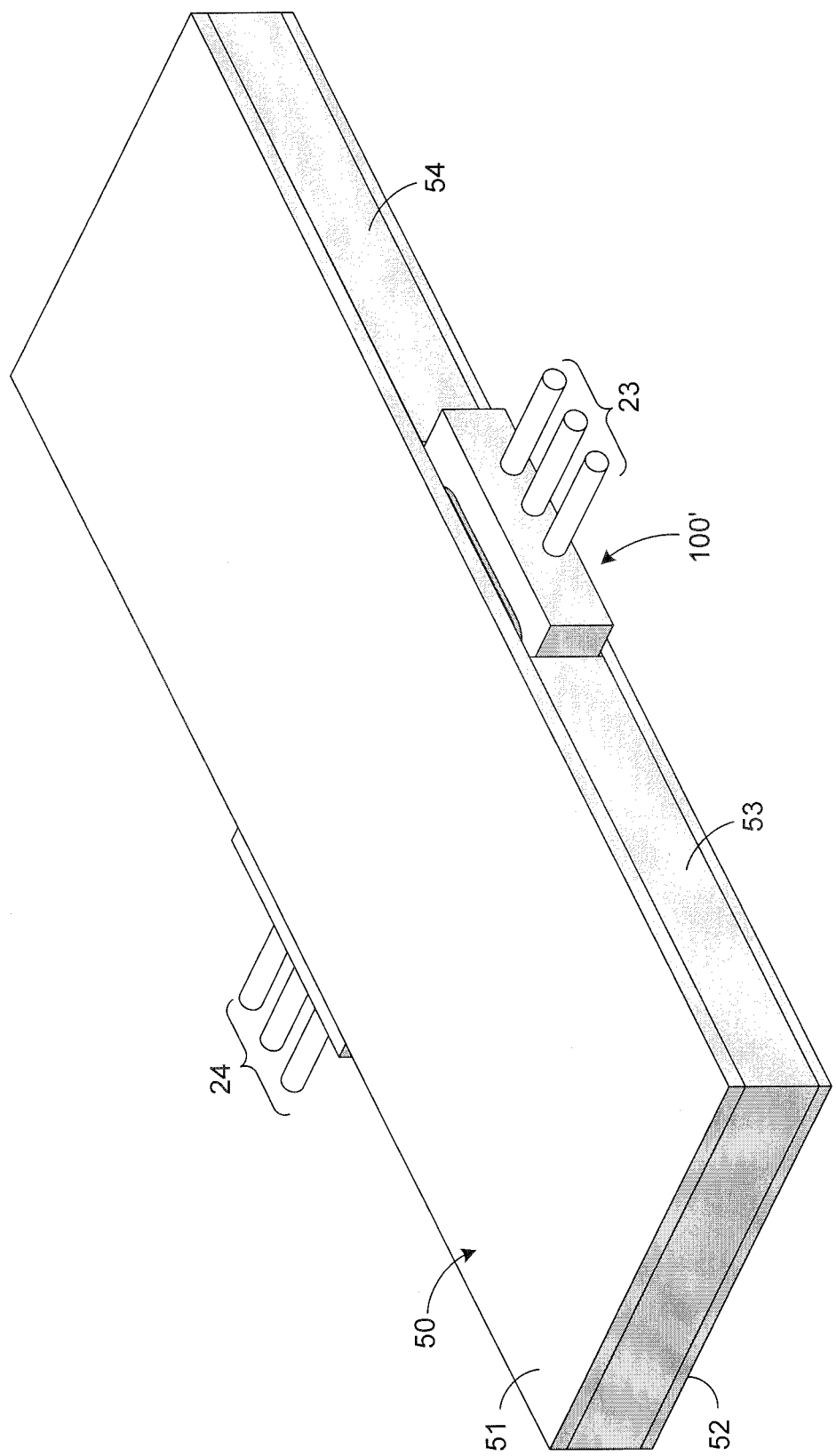
FIG. 9 shows the first exemplary embodiment used in a pulse-forming line application.
Figure 10:
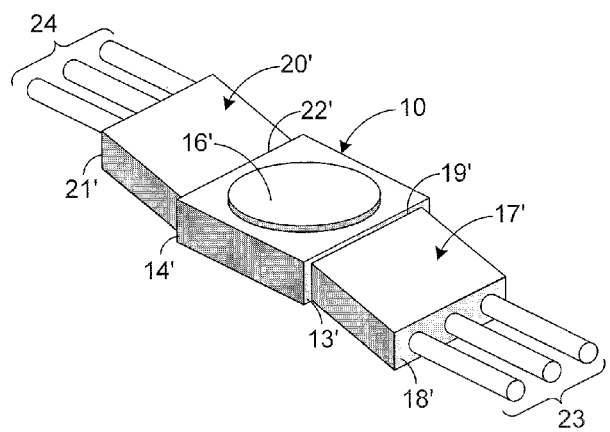
FIGS. 10-13 show various views and at various fabrication stages of a second exemplary embodiment of the photo-conductive switch of the present invention, with the waveguides connected to the switch wafer at an optimal Brewster's angle.
Figure 11:
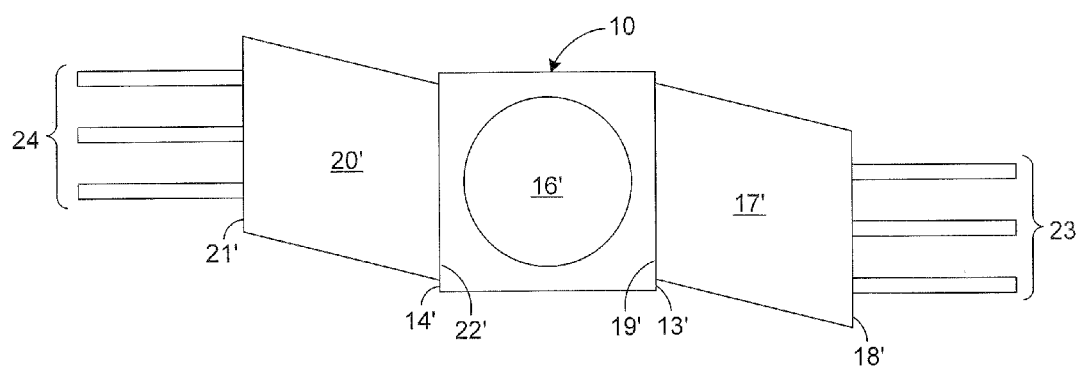

FIG. 9 shows the second exemplary embodiment 100' used in a pulse-forming line application. In particular, the module 100' is sandwiched between two conductor plates 51 and 52 which are in contact with the second metal layers. Additionally two insulators 53 and 54 are also shown providing support between the conductor plates.

Figure 12:
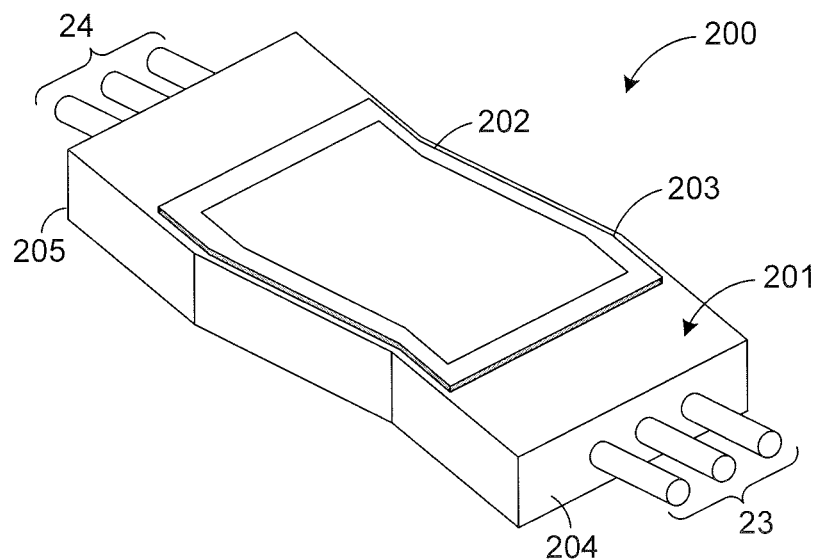
Figure 13:
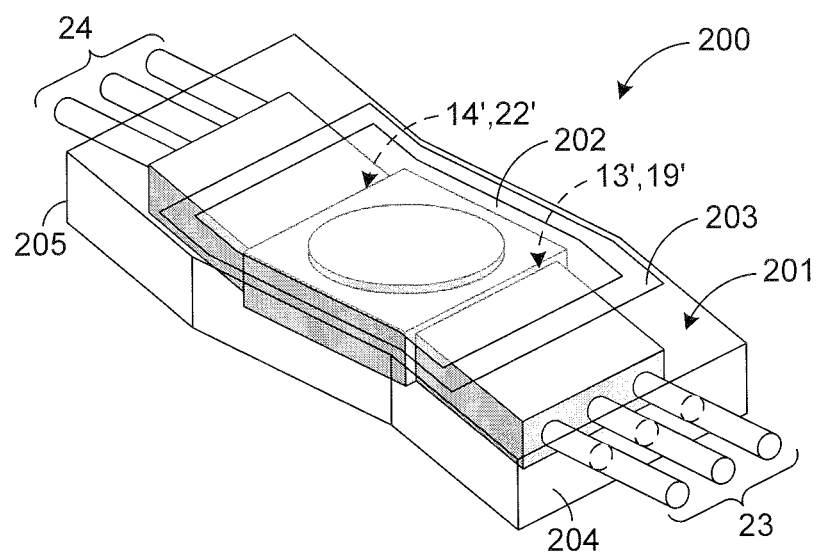

FIGS. 10-13 show various views and at various fabrication stages of a third exemplary embodiment of the photo-conductive switch of the present invention 200, with the waveguides 17' and 20' connected to the switch substrate 10 at an optimal Brewster's angle. The complete module 200 is shown in FIGS. 12 and 13, with FIG. 13 in particular illustrating the overlap of the second metal layer 202 over the waveguide-substrate interface (14', 22', and 13', 19'). An optional resistive layer 203 is also shown.

Figure 14:
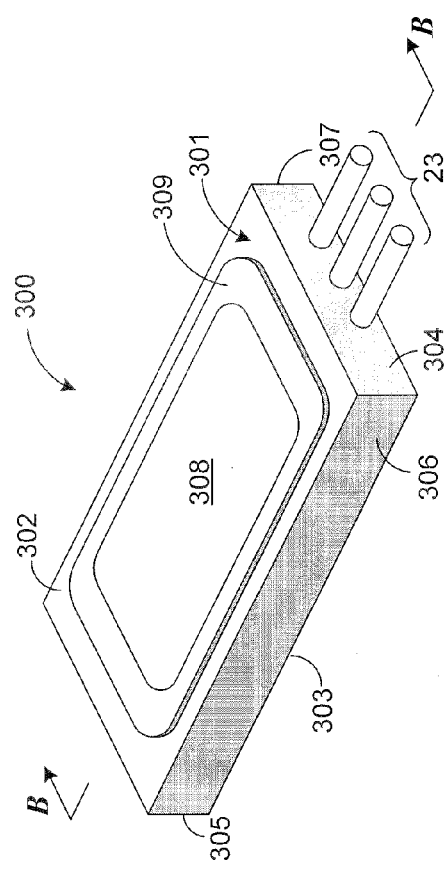
FIGS. 14 and 15 show two views of a third exemplary embodiment of the photo-conductive switch of the present invention, having a single light input surface of the wafer.
Figure 15:
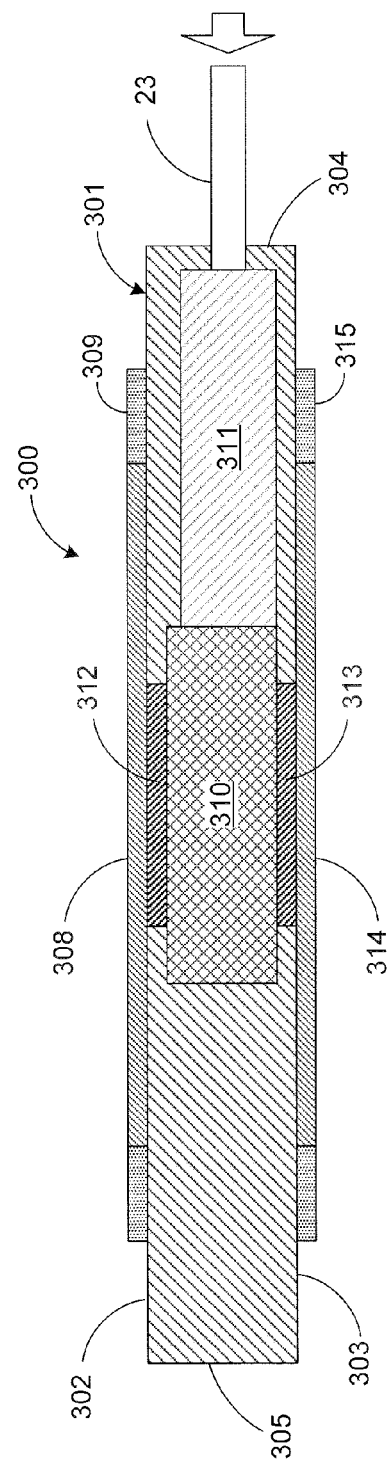
Figure 16:
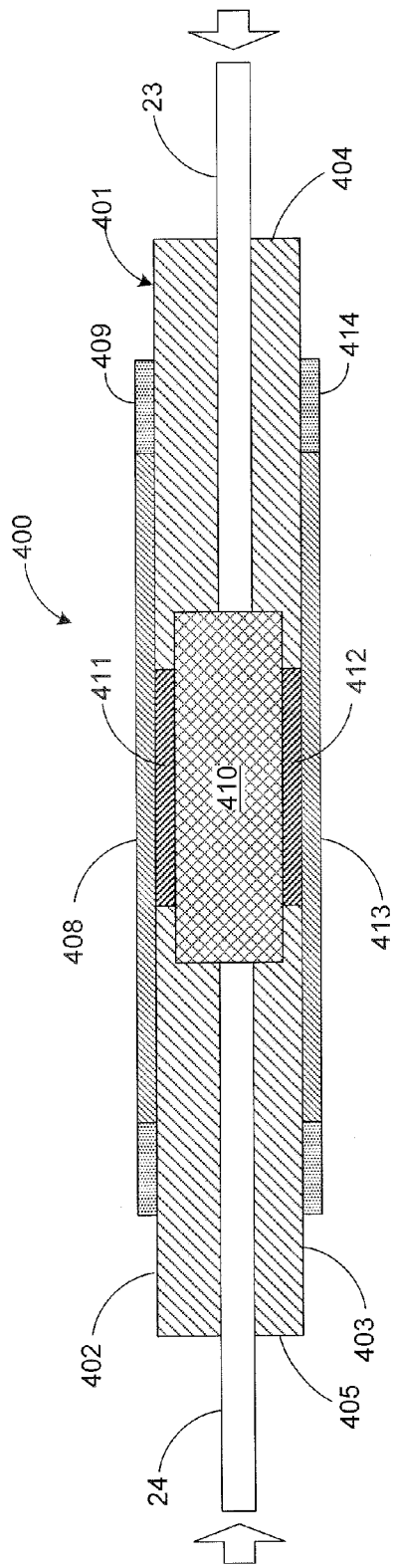
FIG. 16 shows a cross-sectional view of a fourth exemplary embodiment of the photo-conductive switch of the present invention, having fiber optics bonded directly to the substrate.
Figure 17:
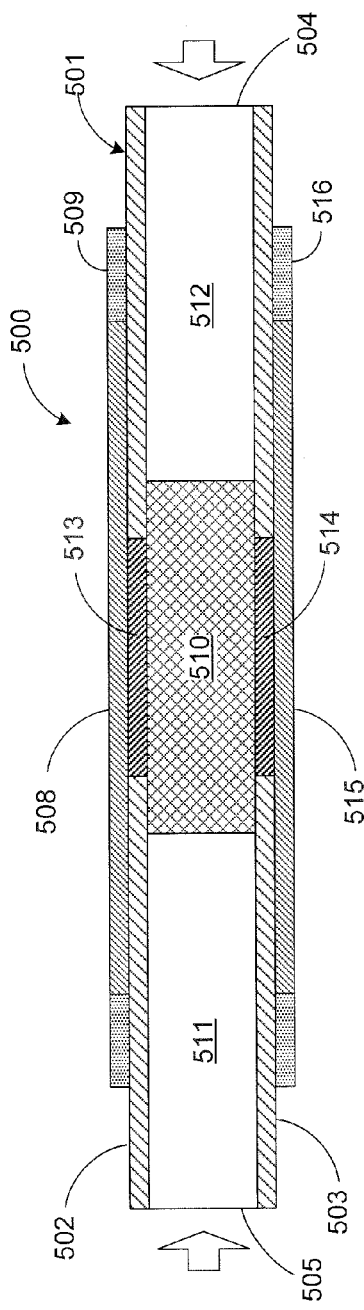
FIG. 17 shows a cross-sectional view of a fifth exemplary embodiment of the photo-conductive switch of the present invention, having two open channels formed by the encapsulation structure by which light may be directly illuminated onto the substrate.
Figure 18:
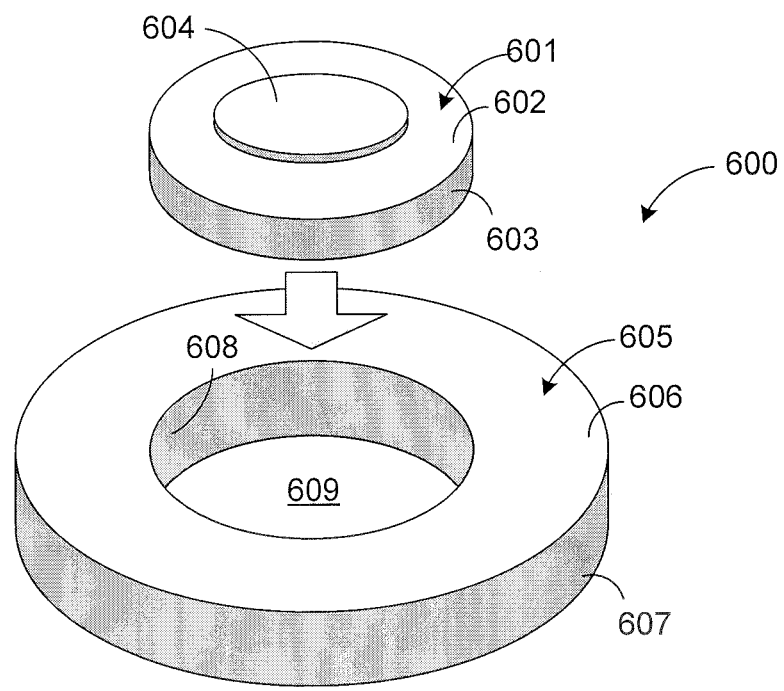
FIGS. 18-23 show various views and at various fabrication stages of a sixth exemplary embodiment of the photo-conductive switch of the present invention, with the substrate and waveguide having cylindrical and tubular configurations, respectively.

FIGS. 14 and 15 show two views of a third exemplary embodiment of the photo-conductive switch of the present invention 300, having a single light-input surface of the substrate. A single waveguide 311 is shown bonded to the substrate, with optical fiber 23 bonded to the single waveguide. FIG. 16 shows a cross-sectional view of a fourth exemplary embodiment of the photo-conductive switch of the present invention 400, having fiber optics 23 and 24 bonded directly to the substrate at opposite ends. And FIG. 17 shows a cross-sectional view of a fifth exemplary embodiment of the photo-conductive switch of the present invention 500, having two open channels 511 and 512 formed by the encapsulation structure by which light may be directly illuminated onto the substrate.

FIGS. 18-23 show various views and at various fabrication stages of a sixth exemplary embodiment of the photo-conductive switch of the present invention 600, with the substrate and waveguide having cylindrical and tubular configurations, respectively. In this example embodiment, the substrate 601 is a cylinder having a top surface 601 and tubular outer surface 603. A first metal layer 604 is shown formed and annealed on the top surface (with another on the bottom surface, though not shown). The annealed substrate is then inserted into the hole 609 of a ring-shaped waveguide 605 having a top surface 606 and tubular outer surface 607. It also has a tubular inner surface 608 which contacts and interfaces the outer surface 603 of the substrate, and together forms the waveguide-substrate interface.

Figure 19:
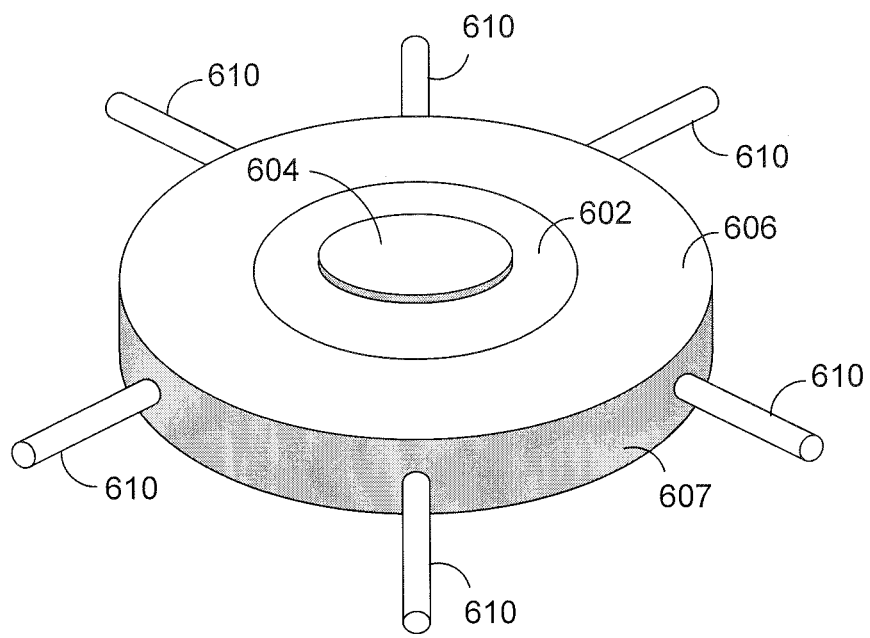
Figure 20:
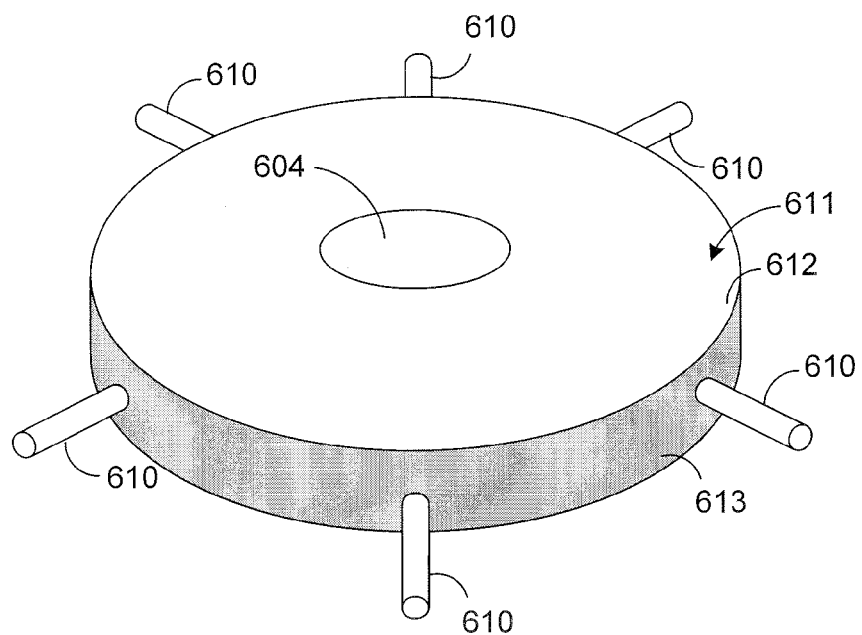
Figure 21:
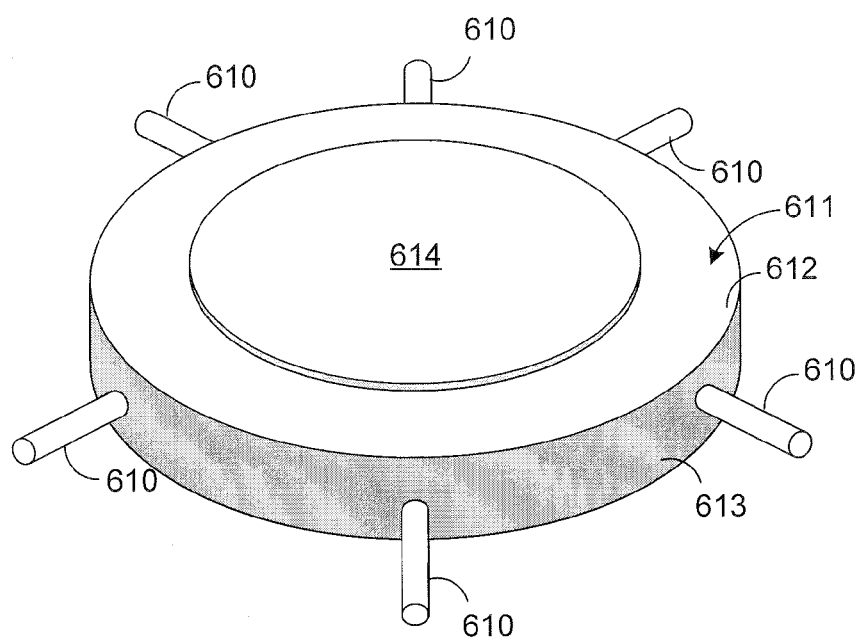
Figure 22:
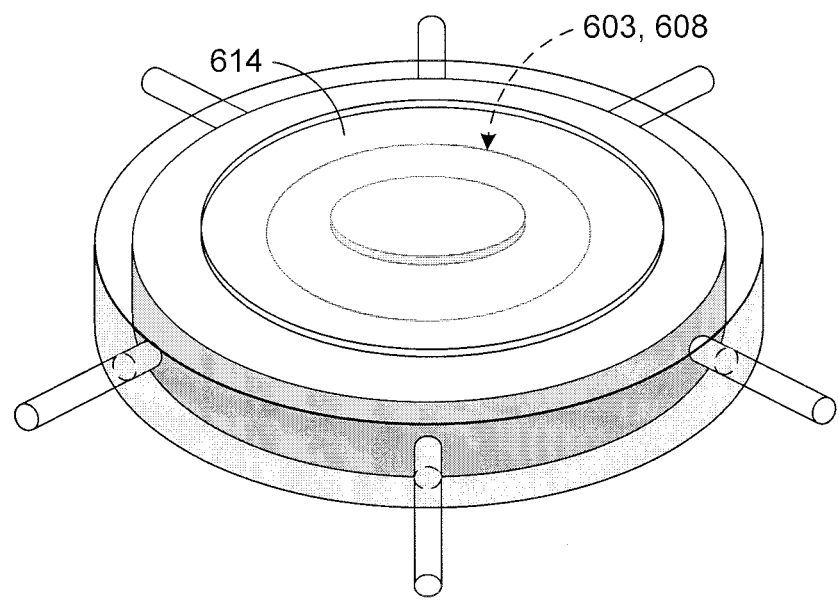
Figure 23:
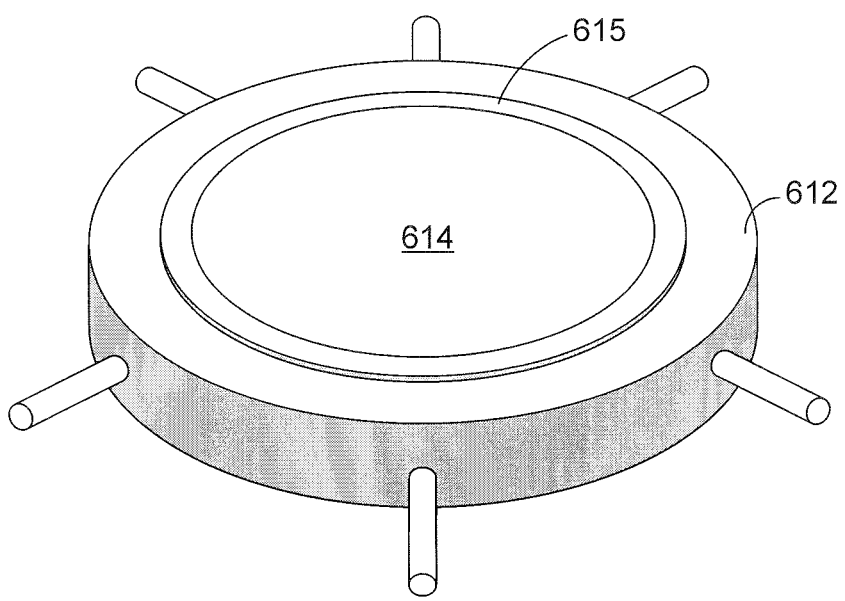

FIG. 19 shows optical fibers 610 bonded to the waveguide evenly around its perimeter. And FIG. 20 shows encapsulation structure 611 formed to surround the assembly of FIG. 18, with only the first metal layer 604 exposed, and the optical fibers 610 extending out. And FIG. 21 shows a second metal layer 614 formed, and in FIG. 23 an optional resistive layer 612 formed on the top surface 612 of the encapsulation layer to surround the second metal layer 614.

While particular operational sequences, materials, temperatures, parameters, and particular embodiments have been described and or illustrated, such are not intended to be limiting. Modifications and changes may become apparent to those skilled in the art, and it is intended that the invention be limited only by the scope of the appended claims.

We claim:

1. A photo-conductive switch package module comprising:
   a photo-conductive substrate having opposing electrode-interface surfaces, and a light-input surface;
   a first metal layer formed on each of said electrode-interface surfaces;
   an optical waveguide having input and output ends with the output end bonded to the light-input surface of the photo-conductive substrate to form a waveguide-wafer interface for coupling light into said photo-conductive wafer;
   a dielectric encapsulation surrounding the photo-conductive substrate and optical waveguide so that only the metal layers and the input end of the optical waveguide are exposed; and
   a second metal layer formed on each of said first metal layers so that the waveguide-substrate interface is positioned under the second metal layers.

2. The photo-conductive switch package module of claim 1,
   wherein the photo-conductive substrate has at least one additional light-input surface;
   wherein said module further comprises at least one additional optical waveguide having input and output ends with the output end bonded to the at least one additional light-input surface of the photo-conductive substrate to form an additional waveguide-wafer interface for coupling light into said photo-conductive substrate;
   wherein the dielectric encapsulation additionally surrounds the at least one additional optical waveguide so that only the first metal layers and the input ends of the optical waveguides are exposed; and
   wherein the second metal layers are formed on said first metal layers so that the waveguide-wafer interfaces are positioned under the second metal layers.

3. The photo-conductive switch package module of claim 1,
   wherein the first metal layers are annealed.

4. The photo-conductive switch package module of claim 1,
   wherein the additional optical waveguide is bonded opposite the first optical waveguide.

5. The photo-conductive switch package module of claim 1,
   wherein the optical waveguide is an optically transparent, thermally conductive material to simultaneously couple light into and conduct heat away from the photo-conductive wafer.

6. The photo-conductive switch package module of claim 1,
   wherein the optical waveguide is bonded to the photo-conductive wafer with an optically transparent material, or chemical bond or fusion bond.

7. The photo-conductive switch package module of claim 1,
   wherein the optical waveguide comprises optical fibers.

8. The photo-conductive switch package module of claim 1,
   wherein the optical waveguide is bonded at an optimal Brewster's angle to the substrate.

* * * * *